United States Patent Office 3,178,391
Patented Apr. 13, 1965

3,178,391
ISOCYANATES AND ISOTHIOCYANATES AND A PROCESS FOR PRODUCING THE SAME
Hans Holtschmidt, Cologne-Stammheim, and Otto Bayer, Leverkusen, Germany, assignors to Farbenfabriken Bayer Aktiengesellschaft, Leverkusen, Germany, a corporation of Germany
No Drawing. Filed Oct. 29, 1959, Ser. No. 849,460
Claims priority, application Germany, Oct. 31, 1958, F 26,941
10 Claims. (Cl. 260—46.5)

This invention relates to a new class of isocyanates and to a method of producing the same and more particularly to a class of isocyanates and isothiocyanates containing silicon atoms within the molecule.

Isocyanates and isothiocyanates having at least one silicon atom within the molecule have been known heretofore. However, in these silicon-containing isocyanates and isothiocyanates the —NCO or —NCS group is connected directly to the silicon atoms. It is known that the silicon-nitrogen bond is relatively weak compared to that of the silicon-oxygen bond. These compounds belong to the class of acyl isocyanates in which the isocyanate groups are very labile and reactive so that the isocyanates are destroyed even by traces of moisture.

It has also been known to produce isocyanates and isothiocyanates from organic compounds containing primary amines by the reaction of these primary amines with phosgene or thiophosgene depending upon the resulting product desired.

It is an object of this invention to provide a new class of isocyanates and isothiocyanates containing silicon atoms. It is another object to provide a new class of isocyanates and isothiocyanates which are more stable than those heretofore known. It is another object to provide a new class of isocyanates and isothiocyanates which can be prepared in a much greater variety than the silicon-containing isocyanates and isothiocyanates heretofore known. It is a further object to produce silicon-containing isocyanates which produce stable products when reacted with compounds containing active hydrogen containing groups. It is another object to provide a new class of isocyanates and isothiocyanates which exhibit improved properties when reacted with organic compounds containing active hydrogen containing groups. It is still another object to provide a method of preparing organosilicone isocyanates or isothiocyanates by reacting carbonyl halides or thiocarbonyl halides with monomeric or polymeric silicic acid esters or silanol ethers containing amino groups. It is a further object to provide a method of preparing polyisocyanate and polyisothiocyanates containing at least one silicon atom. It is still another object to provide polyurethane plastics having a greater resistance to high temperatures than those heretofore known.

The foregoing objects and others which will become apparent from the following description are accomplished in accordance with the invention, generally speaking, by providing a new class of isocyanates and isothiocyanates in which the —NCO and —NCS groups are connected to the silicon atoms through an oxy-organic bond and having the generic formula:

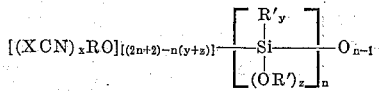

in which R' is a monovalent organic radical, R is an organic radical having $x+1$ free valencies, X is either oxygen or sulfur, $x$ is an integer of 1, 2 or 3, $n$ is an integer of at least one, $y$ and $z$ are integers of 0, 1, 2 or 3 where the sum of $y$ and $z$ does not exceed two, when $n$ is greater than one and does not exceed three when $n$ equals one.

Compounds of this nature are produced in accordance with this invention by the phosgenation or thiophosgenation of the corresponding silicic acid ester or silanol ether which contain primary amino groups corresponding in position to the —NCX groups of the above formula. That is, the amino group is included in the radical having the formula —OR—(NH$_2$)$_x$ where $x$ is an integer of 1, 2 or 3, having $x+1$ free valencies.

It is surprising that the isocyanate which contains a silicon-oxygen bond in accordance with this invention results from the phosgenation or thiophosgenation of the corresponding amine. This is unusual in that it is known that carboxylic acid chlorides react with silicic acid esters causing a splitting of the silicon-oxygen bond and formation of carboxylic acid esters (Journal of Organic Chemistry, volume 7, page 528, 1942). For example, when acetyl chloride and orthosilicic acid tetraethyl ester are reacted, the silicon-oxygen bond of one of the ethoxy groups attached to the silicon atom is broken resulting in the products triethoxychlorosilane and ethylacetate, in accordance with the following equation:

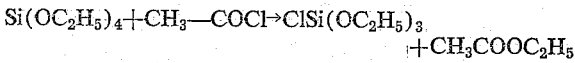
$+CH_3COOC_2H_5$

Since phosgene is the acid chloride of carbon dioxide, it would be expected that the reaction of a silicic acid ester or silanol ether containing amine groups would follow the pattern set forth above with the breaking of the silicon oxygen bond and the production of the corresponding reaction products, however, contrary to this the silicon oxygen bond is not broken and the corresponding isocyanate is formed in a smooth reaction.

Monomeric or polymeric silicic acid esters or silanol ethers comprising primary amino groups are readily obtainable in good yields by the trans-esterification of the corresponding silicic acid esters and silanol ethers with aminohydroxy organic compounds having the formula HORNH$_2$ where R is a divalent organic radical such as, for example, alkylene including ethylene, vinylene, propylene, propenylidene, butylene, butylidene, amylene and the like; arylene such as, for example, phenylene, naphthylene, phenanthrylene, anthrylene, indenylene, diphenylene, substituted phenylene and naphthylene such as, for example, methylphenylene, methylnaphthylene, and the like; alkarylene such as, for example, tolylene, durylene, ethylphenylene, mesitylene, propylphenylene, xylylene and the like; aralkylene such as, for example, benzylidene, styrene, cinnamylidene, cuminylidene, phenylethylene, phenylpropylene, phenylbutylene, naphthylethylene and the like; cycloaliphatic such as, for example, cyclopropylene, cyclobutylene, cyclopentylene, cyclohexylene, cyclopentylidene, cyclohexylidene, cycloheptylidene and the like; and divalent heterocyclic such as, for example, furfurylidene, pyridylidene, indolylidene, and the like.

Specific examples of compounds in accordance with the above formula include, β-aminoethyl alcohol, aminopropyl alcohol, 3-aminobutyl alcohol, 4-aminobutyl alcohol, 5 - aminopentanol-1, 6-aminohexanol, 10-aminodecanol, aminophenol, diaminophenol, 4 - aminocyclohexanol, aminocresol, p-aminophenylethyl alcohol, p-aminophenylmethylcarbinol, aminonaphthanol, diaminonaphthanol, ammeline and the like.

The novel isocyanates of this invention are prepared by phosgenating the corresponding amino-containing silicic acid esters and silanol ethers having the general formula:

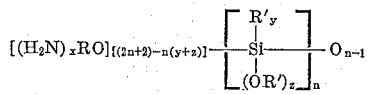

where R' is a monovalent organic radical such as, for example, alkyl, aryl, alkaryl, aralkyl, cycloaliphatic and heterocyclic. Suitable alkyl radicals include, for example, methyl, ethyl, propyl, butyl, amyl, hexyl, and the like. Suitable aryl radicals include, for example, phenyl, naphthyl, xenyl, and the like. Suitable alkaryl radicals include such as, for example, tolyl, xylyl, mesityl, dimethylphenyl, methyldiphenyl, duryl, ethylphenyl, propylphenyl, butylphenyl, methylnaphthyl, ethylnaphthyl, butylnaphthyl and the like. Suitable aralkyl radicals include such as, for example, benzyl, phenylethyl, phenylpropyl, benzohydryl, cinnamyl and the like. Cycloaliphatic radicals include such as, for example, cyclopropyl, cyclobutyl, cyclopentyl, cyclohexyl, cyclopentenyl, cyclopentadienyl, cyclohexanyl, cyclohexadienyl and the like. Heterocyclic radicals include such as, for example, furfuryl, furyl, pyridyl, indolyl and the like.

R is an organic radical having $x+1$ free valencies, such as, for example, alkylene, such as, for example, methylene, ethylene, vinylene, propylene, propenylidene, butylene, butylidene, amylene and the like; arylene such as, for example, phenylene, naphthylene, anthrylene, phenanthrylene, indenylene, diphenylene, substituted phenylene and naphthylene such as, for example, methylphenylene, methylnaphthylene, and the like; alkarylene such as, for example, tolylene, durylene, ethylphenylene, mesitylylene, propylphenylene, xylylene and the like; aralkylene such as, for example, benzylidene, styrene, cinnamylidene, cuminylidene, phenylethylene, phenylpropylene, phenylbutylene, naphthylethylene and the like; cycloaliphatic such as, for example, cyclopropylene, cyclobutylene, cyclopentylene, cyclohexylene, cyclopentylidene, cyclohexylidene, cycloheptylidene and the like and divalent heterocyclic such as, for example, furfurylidene, pyridylidene, indolylidene and the like.

$n$ is an integer depending upon the molecular weight of the compound and is at least one and may be an integer from 1 to 1000 and more, $y$ and $z$ are integers which may be 0, 1, 2 or 3 with the sum of $z$ and $y$ never exceeding two when $n$ is greater than one and never exceeding three when $n$ equals 1. $x$ is an integer of 1, 2 or 3.

Specific examples of compounds which are included in the previous formula are compounds having the formula:

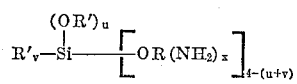

where $x$, R' and R have the same significance as set forth in the preceding formula, $u$ and $v$ are integers of 0, 1, 2 or 3 with the sum of $u$ and $v$ never exceeding three. Specific examples of compounds in accordance with this equation are as follows:

(1) $Si(O-\langle\rangle-NH_2)_4$ (2) 
$$CH_3$$
$$|$$
$$Si(OCH_2-CH_2-NH_2)_2$$
$$|$$
$$CH_3$$

(3) $(CH_3)_3-Si-OCH_2-CH_2NH_2$ (4) 
$$CH_3 \quad\quad CH_3$$
$$|\quad\quad\quad\quad\quad |$$
$$CH_3-C-Si-(O-CH_2-CH_2-CH-NH_2)_3$$
$$|$$
$$CH_3$$

(5) $CH_3-Si(-O-\langle\rangle-NH_2)_3$ with $CH_3$ (6) $(CH_3)_2Si(-O-\langle\rangle-NH_2)_2$ with $Cl$

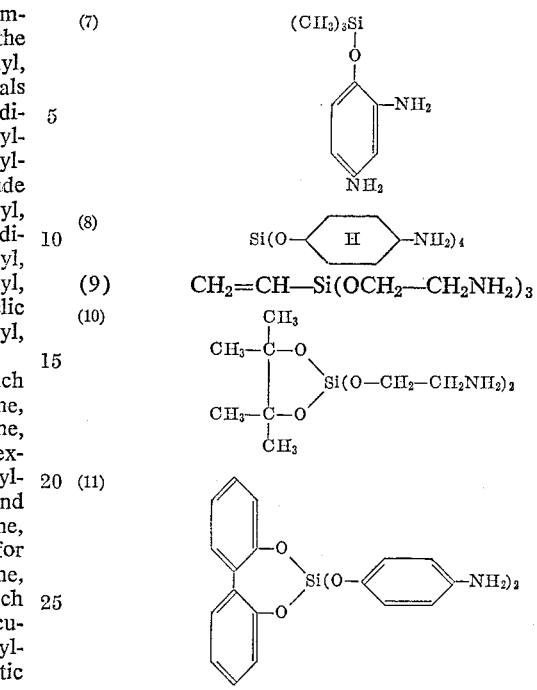

Other suitable amino-containing silicic acid esters and silanol ethers are the polymeric silicic acid esters and silanol ethers, commonly known as siloxanes, having the formulae as follow:

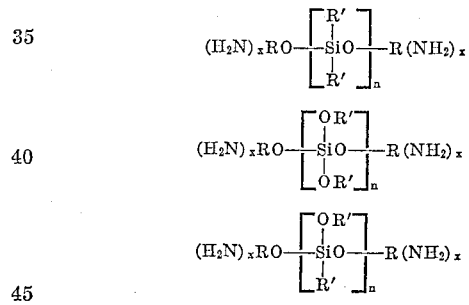

wherein $x$, R' and R have the same significance as set forth above and $n$ is an integer of at least one depending upon the molecular weight of the silicone and preferably is an integer between 1 and 1000 or more.

As stated previously, $n$ is an integer from 1 to about 1000 and more. The maximum value of $n$ is determined by the molecular weight of the specific organopolysiloxane, which may be as high as 50,000 and even higher than 50,000. The only limitation being that the amino-containing organic polysilicon is sufficiently soluble in a solvent in accordance with the method followed in the preparation of the corresponding isocyanate or isothiocyanate.

In accordance with the invention, the amine-containing compounds set forth above are converted into the corresponding isocyanate or isothiocyanate by treating the compound with phosgene or thiophosgene in accordance with any of the procedures set forth in U.S. Patents 2,680,128, 2,680,129, 2,733,254, and 2,837,554. This process can be carried out either continuoussly or intermittently. Further, the conversion of the amino-containing compound can be accomplished by a cold-phase-hot phase procedure or by the hydrochloride process. It is advantageous in either procedure to dissolve the amino-containing compound in an inert solvent such as, for example, chlorobenzene, orthodichlorobenzene, nitrobenzene, and the like. Although it is not necessary to utilize an inert solvent in the preparation of the isocyanate and isothiocyanates of this invention, it is preferred. It is further preferred to utilize the cold phase-hot phase procedure in converting the amino-containing compound to the isocyanate or isothiocyanate compound since in the first step of this procedure the amine is converted to mixtures of carbamic acid chlorides and amine hydrochloride. These intermediates, which are in a finely divided suspension are readily converted to the isocyanate in the hot phase step of this procedure in a short period of time at relatively lower temperatures than necessary in the hydrochloride process. Although the cold-phase-hot phase method is preferred, the hydrochloride process is suitable and may be used if desired.

The process according to the invention permits the production of isocyanates and isothiocyanates having any number of isocyanate groups or isothiocyanates groups desired, depending upon the starting compound chosen. The isocyanates and isothiocyanates which are obtained can be purified by known techniques such as, for example, by distillation or recrystallization. In many instances the products obtained need no further purification, while in other instances only a brief heating of the reaction material in vacuo below the boiling point or by blowing the reaction material with an inert gas at elevated temperatures will be adequate for destroying any carbamic acid chlorides which may still be present or for removing excess phosgene or thiophosgene.

In the preparation of either isocyanates or isothiocyanate in accordance with this invention, the corresponding amine is treated either with a carbonyl halide such as, for example, phosgene, bromophosgene, and the like or with a thiocarbonyl halide such as, for example, thiophosgene, thiobromophosgene and the like in the manner previously stated. The temperature in the phosgenation step of the preparation of the isocyanate or in the thiophosgenation step in the preparation of the isothiocyanates should not exceed 250° C. and it is preferred that the temperatures remain within the range of from about 60° to about 160° C. If the temperatures in the preparation of the isocyanate from the corresponding amine exceeds the maximum set forth above, the yield is reduced because of the splitting of the silicon oxygen bond.

The isocyanates and isothiocyanates prepared in accordance with this invention have the following general formula:

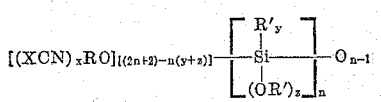

wherein R', R, x, y, z and n have the same significance as previously set forth and X is ether oxygen or sulfur. These compounds, because of the –NCO and –NCS groups present in the molecule, are reactive with organic compounds containing active hydrogen containing groups in the molecule to form polyurethane type plastics. An organic compound containing active hydrogen is one that gives a positive Zerewitinoff test.

Examples of such compounds containing active hydrogen containing groups in the molecule are such as, for example, mono- and polyfunctional alcohols, primary and secondary amines, compounds containing carboxylic acid groups, water, hydroxyl polyesters, polyester amides, polyalkylene ethers, polyhydric polythioethers, polyacetals, and organic compounds containing enolizable hydrogen atoms.

Any suitable alcohol may be used to react with the isocyanates or isothiocyanates of this invention such as, for example, ethanol, propanol, butanol, and the like; polyhydric alcohols such as, for example, ethylene glycol, diethylene glycol, propylene glycol, 1,3-butylene glycol, 1,6-hexandiol, trimethanol propane, pentaerythritol, glycerine and the like. Any suitable primary or secondary amine may be used to react with the isocyanates and isothiocyanates of this invention such as, for example, ethyl amine, propyl amine, butyl amine, amylene amine, ethylene diamine, hexamethylene diamine, 3-methylhexamethylene diamine, decamethylene diamine, m-phenylene diamine, toluene diamine, and the like.

Any suitable compound containing carboxylic acid groups may be used to react with the isocyanates and isothiocyanates of this invention such as, for example, oxalic acid, succinic acid, adipic acid, methyladipic acid, glutaric acid, pimelic acid, sebacic acid, azelaic acid, suberic acid, phthalic acid, terephthalic acid, 1,2,4-benzene tricarboxylic, maleic acid, fumaric acid, itaconic acid, citraconic acid and the like.

Any suitable hydroxyl polyester may be used to react with the isocyanates and isothiocyanates of this invention, such as, for example, those produced by the thermal condensation of a polycarboxylic acid and a polyhydric alcohol. Any suitable polycarboxylic acid may be used such as, for example, succinic, oxalic, adipic, methyladipic, sebacic, glutaric, pimelic, azelaic, suberic, and the like; aromatic carboxylic acids including phthalic, terephthalic, isophthalic, 1,2,4-benzene tricarboxylic, and the like; sulphur containing acids such as, for example, thiodiglycolic, thiodipropionic, and the like; unsaturated acids such as, for example, maleic, fumaric, itaconic, citraconic, and the like. Any suitable polyhydric alcohol may be used such as, for example, ethylene glycol, diethylene glycol, propylene glycol, 1,3-butylene glycol, 1,6-hexane diol, trimethylol propane, pentaerythritol, gylcerine, and the like.

Any suitable polyhydric polyalkylene ether may be used, such as, for example the product obtained by polymerizing alkylene oxides or the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexane diol, hexane triol, and the like. Any suitable alkylene oxide may be used such as, for example, ethylene oxide, propylene oxide, butylene oxide, amylene oxide, and the like. The polyhydric polyalkylene ethers may be prepared by any known process such as, for example, the process described in Wurtz in 1859 and in "Encyclopedia of Chemical Technology," volume 7, pages 257 to 262, published by Interscience Publishers Inc. (1951), or in U.S. Patent 1,922,459.

Any suitable polyhydric polythioether may be used such as, for example, the reaction product of one of the aforementioned alkylene oxides used in the preparation of polyhydric polyalkylene ether with a thioether glycol such as, for example, thiodiglycol, 3,3'-dihydroxypropyl sulfide, 4,4'-dihydroxybutyl sulfide, 1,4-(beta hydroxy ether) phenylene dithioether and the like.

Any suitable polyester amide may be used such as, for example, the reaction product of an amine and/or amino alcohol with a carboxylic acid. Any suitable amine such as, for example, ethylene diamine, propylene diamine, and the like may be used. Any suitable amino alcohol, such as, for example 1-hydroxy-2-amino ethylene, and the like may be used. Any suitable polycarboxylic acid may be used such as, for example, those more particularly disclosed above for the preparation of hydroxy polyesters.

Any suitable polyacetal may be used such as, for example, the reaction product of an aldehyde and a polyhydric alcohol. Any suitable aldehyde may be used such as, for example, formaldehyde, paraldehyde, butyraldehyde, and the like. Any of the polyhydric alcohols mentioned above in the preparation of the hydroxyl polyesters may be used.

Any suitable organic compound containing activated methylene groups may be used such as, for example, compounds containing enolizable hydrogen atoms, such as, for example aceto acetic ester, diethyl malonate, methyl-m-butyl malonate, acetyl acetone, acetonyl acetone, and the like.

The isocyanates and isothiocyanates prepared in accordance with the invention are valuable starting materials for the production of polyurethane plastics by the isocyanate polyadditional process. These plastics may be either porous or non-porous products and may be used in the manufacture of cushions for furniture, automobile tires, gears, diaphragms and the like.

The invention is further illustrated but not limited by the following examples wherein parts and percentages are by weight unless otherwise specified.

*Example 1*

About 272 g. (½ mol) of orthosilicic acid-tetra-cis-p-amino-o-cresyl ester having the formula:

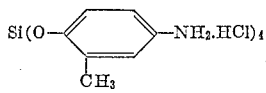

and prepared by trans-esterification of silicic acid tetraethyl ester with p-amino-o-cresol are dissolved in about 3 litres of dry chlorobenzene. Hydrochloric acid is then introduced to the saturation point. A light-colored crystalline precipitate is obtained which represents the hydrochloride of the corresponding tetramine. Phosgene is now introduced at about 100° C. into the suspension of the hydrochloride. After introducing phosgene for about 6 hours, the total quantity thereof has dissolved. The mixture is blown for about 2 hours with nitrogen in order to drive off the excess phosgene. It is thereafter clarified over dry active carbon and the chlorobenzene is distilled off in vacuo. There remains a brownish oil, which is the isocyanate of the formula

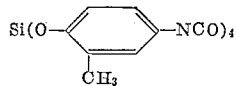

Yield: 85% of the theoretical.

*Analysis.*—Calculated for $C_{32}H_{24}O_8N_4Si$: Mol. weight, 620.6; C, 61.8%; H, 3.89%; N, 9.0%; Si, 4.5%. Found: C, 61.2%; H, 4.03%; N, 8.5%; Si, 4.7%.

*Example 2*

About 264 g. (1 mol) of the compound having the formula:

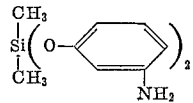

and prepared by trans-esterification of m-aminophenol with dimethyl dibutoxysilane are introduced dropwise at about 0° C. into a solution of about 700 g. of phosgene in about 3 litres of chlorobenzene. Thereafter, after standing overnight for about 12 hours, phosgenation is effected for about 6 hours while slowly raising the temperature to a maximum temperature of about 110° C. until everything has dissolved. The isocyanate of the formula

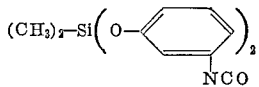

B.P.$_{0.05}$ 150–155° C., remains in a yield which is 84% of the theoretical.

*Example 3*

About 360 g. (0.5 mol) of a dimethyl polysiloxane, which has been obtained by trans-esterification of dibutoxy-dimethylsiloxane with m-amino-o-cresol and has the terminal groups

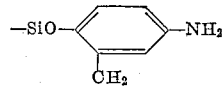

are phosgenated for about 4 hours at about 120° C. while stirring vigorously and thereafter worked up in the usual manner. There remains a thinly viscous oil. Isocyanate number calculated: 9%. Found: 9.5%.

*Example 4*

1000 parts by weight of a linear polyester prepared from adipic acid and ethylene glycol (molecular weight 2000, OH number 56, acid number 0.3) are dehydrated in vacuo at 110° C. 155 parts by weight (0.25 mol) of the isocyanate prepared according to Example 1 are added. The mixture is stirred and heated for 10 hours at 110° C. in the absence of moisture. If before the heating the reaction mixture is applied as a thin film to a support, an unsoluble surface coating is obtained.

Although the invention has been described in considerable detail in the foregoing, in order to properly illustrate the invention, it is to be understood that the purpose of such detail is solely to illustrate the embodiments of the invention and that modifications can be made by those skilled in the art without departing from the spirit and scope of the invention as set forth in the claims.

What is claimed is:

1. A new class of isocyanates and isothiocyanates having the formula:

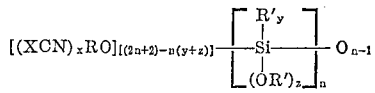

wherein

R' is a member selected from the group consisting of alkyl, aryl, alkaryl, aralkyl, cycloaliphatic hydrocarbon, and heterocyclic;

R is a member selected from the group consisting of alkylene, arylene, alkarylene, aralkylene, cycloaliphatic hydrocarbon, and heterocyclic, said heterocyclic group member in each instance containing only carbon, hydrogen, nitrogen and oxygen and being free from groups reactive with —NCO and —NCS;

X is a member selected from the group consisting of oxygen and sulfur;

n is an integer of at least 1;

x is an integer selected from 1, 2 and 3;

y is an integer selected from 0, 1, 2 and 3;

z is an integer selected from 0, 1, 2 and 3;

the sum of y and z being not greater than 3 when n is 1 and not greater than 2 when n is greater than 1.

2. A new class of isocyanates having the formula:

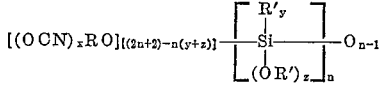

wherein

R' is a member selected from the group consisting of alkyl, aryl, alkaryl, aralkyl, cycloaliphatic hydrocarbon, and heterocyclic;

R is a member selected from the group consisting of alkylene, arylene, alkarylene, aralkylene, cycloaliphatic hydrocarbon, and heterocyclic, said heterocyclic group member in each instance containing only carbon, hydrogen, nitrogen and oxygen and being free from groups reactive with —NCO and —NCS;

n is an integer of at least 1;

x is an integer selected from 1, 2 and 3;

y is an integer selected from 0, 1, and 3;

z is an integer selected from 0, 1, and 3;

the sum of y and z being not greater than 3 when n is 1 and not greater than 2 when n is greater than 1.

3. A new class of isothiocyanates having the formula:

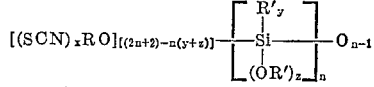

wherein

R' is a member selected from the group consisting of alkyl, aryl, alkaryl, aralkyl, cycloaliphatic hydrocarbon, and heterocyclic;

R is a member selected from the group consisting of alkylene, arylene, alkarylene, aralkylene, cycloaliphatic hydrocarbon, and heterocyclic, said heterocyclic group member in each instance containing only carbon, hydrogen, nitrogen and oxygen and being free from groups reactive with —NCO and —NCS;

$n$ is an integer of at least 1;
$x$ is an integer selected from 1, 2 and 3;
$y$ is an integer selected from 0, 1, 2 and 3;
$z$ is an integer selected from 0, 1, 2 and 3;
the sum of $y$ and $z$ being not greater than 3 when $n$ is 1 and not greater than 2 when $n$ is greater than 1.

4. A new class of isocyanates and isothiocyanates having the formula:

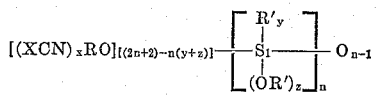

wherein

R' is a member selected from the group consisting of alkyl, aryl, alkaryl, aralkyl, cycloaliphatic hydrocarbon, and heterocyclic;

R is a member selected from the group consisting of alkylene, arylene, alkarylene, aralkylene, cycloaliphatic and heterocyclic, said heterocyclic group member in each instance containing only carbon, hydrogen, nitrogen and oxygen and being free from groups reactive with —NCO and —NCS;

X is a member selected from the group consisting of oxygen and sulfur;

$n$ is an integer of from 1 to about 1000;
$x$ is an integer selected from 1, 2 and 3;
$y$ is an integer selected from 0, 1, 2 and 3;
$z$ is an integer selected from 0, 1, 2 and 3;
the sum of $y$ and $z$ being not greater than 3 when $n$ is 1 and not greater than 2 when $n$ is greater than 1.

5. A process for the preparation of silicon-containing isocyanates and isothiocyanates which comprises reacting a compound having the formula:

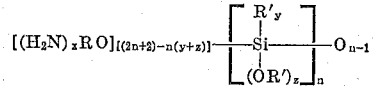

wherein R' is a member selected from the group consisting of alkyl, aryl, alkaryl, aralkyl, cycloaliphatic hydrocarbon, and heterocyclic; R is a member selected from the group consisting of alkylene, arylene, alkarylene, aralkylene, cycloaliphatic hydrocarbon, and heterocyclic; said heterocyclic group member in each instance containing only carbon, hydrogen, nitrogen and oxygen and being free from groups reactive with —NCO and —NCS; $n$ is an integer of at least 1; $x$ is an integer selected from 1, 2 and 3; $y$ is an integer selected from 0, 1, 2 and 3; $z$ is an integer selected from 0, 1, 2 and 3; the sum of $y$ and $z$ being not greater than 3 when $n$ is 1 and not greater than 2 when $n$ is greater than 1, with a member selected from the group consisting of carbonyl halides and thiocarbonyl halides.

6. The process of claim 5 wherein said carbonyl halide is phosgene.

7. A polyurethane plastic prepared by a process which comprises reacting a silicon-containing compound having the formula:

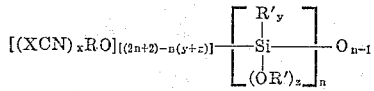

wherein R' is a member selected from the group consisting of alkyl, aryl, alkaryl, aralkyl, cycloaliphatic hydrocarbon and heterocyclic; R is a member selected from the group consisting of alkylene, arylene, alkarylene, aralkylene, cycloaliphatic hydrocarbon and heterocyclic; said heterocyclic group member in each instance containing only carbon, hydrogen, nitrogen and oxygen and being free from groups reactive with —NCO and —NCS; X is a member selected from the group consisting of oxygen and sulfur; $n$ is an integer of at least 1; $x$ is an integer selected from 1, 2 and 3; $y$ is an integer selected from 0, 1, 2 and 3; $z$ is an integer selected from 0, 1, 2 and 3; the sum of $y$ and $z$ being not greater than 3 when $n$ is 1 and not greater than 2 when $n$ is greater than 1, with an organic compound containing active hydrogen containing groups as determined by the Zerewitinoff test; said groups being reactive with —NCO groups to form urethane groups.

8. The polyurethane plastic of claim 7 wherein said active hydrogen containing compound is an hydroxyl polyester prepared by a process which comprises condensing a polycarboxylic acid with a polyhydric alcohol.

9. The compound having the formula:

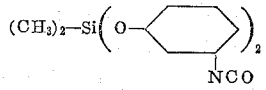

10. The compound having the formula:

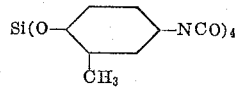

References Cited by the Examiner

UNITED STATES PATENTS 2,532,559  12/50  Klein _____ 260—77.5

FOREIGN PATENTS 946,138  7/56  Germany.
1,066,582  10/59  Germany.

LEON J. BERCOVITZ, *Primary Examiner.*

MILTON STERMAN, H. N. BURSTEIN, WILLIAM H. SHORT, *Examiners.*